(12) United States Patent
Sharma et al.

(10) Patent No.: US 7,508,614 B1
(45) Date of Patent: Mar. 24, 2009

(54) DATA STORAGE DRIVE HAVING MOVEMENT SENSORS

(75) Inventors: Ratnesh K. Sharma, Union City, CA (US); Chandrakant D. Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 93 days.

(21) Appl. No.: 11/784,620

(22) Filed: Apr. 9, 2007

(51) Int. Cl.
G11B 15/46 (2006.01)
G11B 19/02 (2006.01)

(52) U.S. Cl. .................. 360/73.03; 360/69; 702/56; 369/53.18

(58) Field of Classification Search .................. None
See application file for complete search history.

(56) References Cited

U.S. PATENT DOCUMENTS

| | | | |
|---|---|---|---|
| 6,674,600 B1* | 1/2004 | Codilian et al. | 360/75 |
| 2003/0103287 A1* | 6/2003 | Agematsu | 360/60 |
| 2004/0213100 A1* | 10/2004 | Iwashiro | 369/44.32 |

* cited by examiner

*Primary Examiner*—Andrew L Sniezek (57) ABSTRACT

A drive for data storage includes a first component and a second component movable with respect to the first component. The drive also includes a first sensor and a second sensor. The first sensor is in connection with the first component and is configured to detect movement of the first component. The second sensor is in connection with the second component and is configured to detect movement of the second component.

18 Claims, 7 Drawing Sheets

DATA STORAGE DRIVE HAVING MOVEMENT SENSORS

BACKGROUND

Hard drives, which store data on tape, magnetic discs, optical disks, etc., have become increasingly important with the rise in electronic data storage, as seen, for example, in consumer photo, video, and music applications. However, hard drives have long suffered, and continue to suffer, from vibration-related errors.

Vibration-related errors occur when components of the hard drive shake, or are otherwise disturbed. Vibration can be attributed to many different sources, such as external movement of the entire hard drive. Large external vibrations, which are difficult to control, often lead to hard errors, which are major faults from which the hard drive cannot recover without user intervention. More common, however, are relatively smaller vibrations which often lead to soft errors from which the hard drive will attempt to recover without user intervention. Typical soft errors include a disc reading/writing element of the hard drive being unable to lock onto a track in a disc, more commonly known as "skipping."

Vibrations leading to soft errors may originate from several sources, including the natural vibration of moving electrical components. For example, the natural vibrations caused by spinning fan blades and by the movement of recordable media, such as spinning discs, are known to cause soft errors. Moreover, hard drives are often housed alongside other hard drives and other moving components, whose normal operating vibrations are known to cause vibrations in neighboring hard drives.

The problem of soft errors due to the normal operating vibration of moving electrical components is amplified when components vibrate in synchronization. That is, moving components may vibrate at different frequencies depending on several factors, such as the speed at which the component is moving. When multiple components begin vibrating in synchronization, that is, at or near the same frequency, the potential for soft errors is exacerbated. For example, skipping occurs more often when the actuator arm and the chassis of a hard drive vibrate at the same frequency.

While problems caused by vibration have been known for some time, they are more pronounced with later generation hard drives, because components move at faster rates than in earlier hard drives. For example, cooling fans and spinning recordable media in today's systems have much higher revolutions per minute (RPM), as compared to older components. Manufacturers have attempted to deal with the problem of vibration by testing individual hard drives on shaker tables before they are released to consumers. Structural changes are made to hard drives when vibration-related errors are identified in this testing environment.

Current vibration testing in hard drives, however, often leads to lost time and revenue associated with warranties provided by manufacturers. This is because consumers experiencing vibration-related errors return hard drives to manufacturers to correct problems, such as excessive skipping. However, even though manufacturers run the hard drives through a series of diagnostic tests, they are unable to replicate the consumer's working environment. Thus, manufacturers attempting to honor product warranties often cannot duplicate or fix the problems experienced by the consumers.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Disclosed herein are various drives, systems, and methods for detecting and analyzing vibration within the components of the drives and systems. The drives may include hard drives for non-volatile data storage, while the systems may include multiple drives, ventilation mechanisms, and other components commonly found in computing systems. Movement of the various components within the drives and systems may be detected by sensors placed in connection with the components of the drives and systems. The sensors may be any reasonably suitable devices operable to collect data related to movement. For example, the sensor may include accelerometers. "In connection with" components may be defined to include that the sensors have some contact with the component they are monitoring. For instance, a first sensor may be mounted on an actuator arm within a drive and another second sensor may be mounted to the chassis of the same drive. Both sensors may monitor their respective components, the actuator arm and the chassis in this example, for movement. While two sensors are described in this particular example, a person having ordinary skill in the art will appreciate that the drives, systems, and methods described herein may utilize any reasonably suitable number and type of sensor.

The data collected by the sensors may be transmitted to a processor operable to analyze the sensor data, which may include determining the frequency at which a component is vibrating, in response to receiving the data from the sensors. For instance, in the example described above, the first sensor in connection with the actuator arm may transmit data to the processor indicating that the actuator arm is moving back and forth at a particular rate. The processor may receive this information and determine the frequency at which the actuator arm is vibrating. The frequency of vibration may be determined through any reasonably suitable computation or series of computations, such as fast Fourier transforms, as is known in the art. In this manner, the frequency of vibration of multiple components of a drive or system may be determined by receiving information from multiple sensors within the drive or system. For example, the processor may determine the frequency of vibration for both the actuator arm and the chassis of the hard drive described above.

The processor is further operable to compare vibrational frequencies of different components. For example, the processor may compare the vibrational frequency of the actuator arm and the vibrational frequency of the chassis described in the example above to determine whether or not the actuator arm and the chassis are vibrating substantially in synchronization. "Substantially in synchronization" may be defined to include that the different components are vibrating at the same or a similar frequency, that is, within a similar frequency rang with respect to each other. For example, a difference of about 10 to 15 Hz in the vibrational frequencies of different components may be considered substantially in synchronization. According to an example, experiments or in-situ tests, including, for instance, SNMP traps that capture various issues, may be performed to quantify when different components are considered as being "substantially in synchronization." Substantially synchronized vibration of different components in a drive increases the rate of errors in the drive, as discussed above. Therefore, as disclosed herein, steps may be taken to alter the status of a component when the processor determines that different components are vibrating in synchronization.

Altering the status of a component refers to any change in the operation of the component which may yield a change in vibrational frequency. For instance, altering the status of a component may include increasing or decreasing the speed of a component, such as reducing the RPMs at which a ventilation fan or recordable media is spinning. The processor may alter the status of a component automatically, without user intervention, as will be discussed in greater detail below. Alternatively, the processor may take steps to provide a user-perceivable indication to allow a user to alter the status of a component. A user-perceivable indication may include, for example, visual or auditory alarms. By way of example, the processor may transmit an alarm signal to a remote computing device over a network, such as, a wired or wireless internal or external network, to thereby provide the visual or audible alarm to the remote computing device.

The drives, systems, and methods described herein may drastically reduce the occurrence of vibration-related errors in drives and systems by actively modifying the frequency at which a component is vibrating. This change in frequency is designed to substantially prevent components from vibrating in synchronization and, thus, to reduce the occurrence of vibration-related errors. The drives and systems are particularly effective because the sensors are placed in situ within a drive or system and vibration is monitored in real-time, as the components vibrate in actual working environments. Therefore, the effectiveness of the methods described herein is maximized because they evaluate current operating conditions. These methods thus increase the reliability of drives and systems and reduce the return rate of drives and systems on warranty issues.

Figure 1:
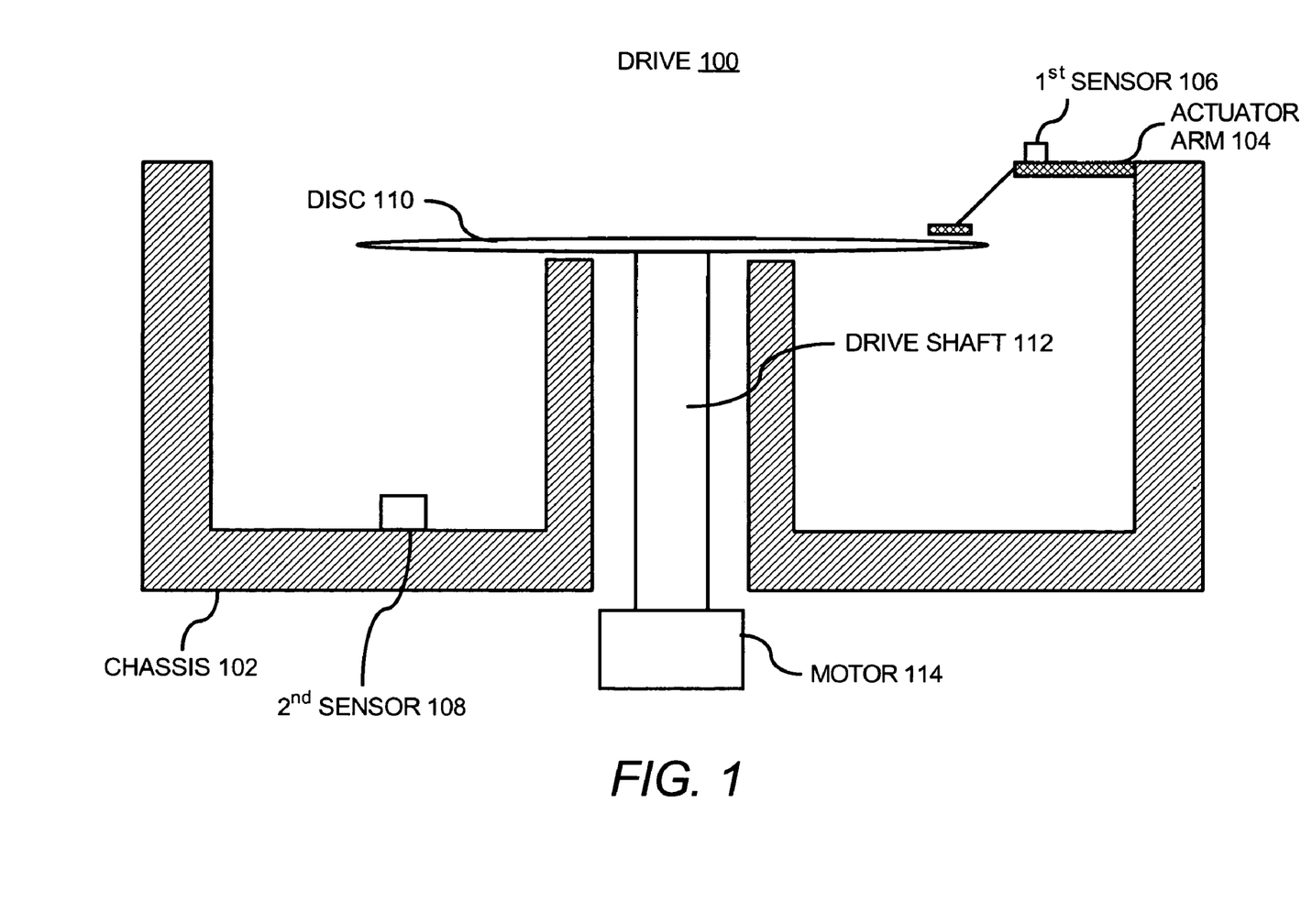
FIG. 1 illustrates a cross-sectional side view of a drive having a first and second sensor, according to an embodiment.

FIG. 1 illustrates a partial cross-sectional side view of a drive 100 having a first sensor 106 and a second sensor 108, according to an embodiment. The drive 100 depicted in FIG. 1 is a hard drive for storing data to, and/or reading data from, a disc 110. For example, the disc 110 may be a magnetic disc, a compact disc (CD), a digital video disc (DVD), etc. However, the drive 100 is depicted as a disc drive for illustration purposes only, and persons having ordinary skill in the art will appreciate that the drive 100 may be any reasonably suitable electronic device for storing data to, or reading data from, any form of non-volatile storage media.

The first sensor 106 is in connection with an actuator arm 104. The actuator arm 104 may be any part of a reading/writing element which reads data from, or writes data to, a data storage medium, as is known in the art. The second sensor 108 is in connection with the chassis 102 of the drive 100. FIG. 1 depicts the label "chassis 102" pointing to a left support element of the frame of the drive 100 for simplicity; however, the chassis may 102 include the entire chassis of the drive 100 or other parts of the drive 100.

FIG. 1 depicts the first sensor 106 mounted on the top of a central portion of the actuator arm 104. However, the first sensor 106 may be in connection with any portion of the actuator arm 104, which may also include two or more sensors mounted in any reasonably suitable locations on the actuator arm 104. Similarly, the chassis 102 may also include two or more sensors 108 in connection with the chassis 102 in any reasonably suitable locations.

In FIG. 1, the first and second sensors 106 and 108 are in connection with the actuator arm 104 and the chassis 102, respectively, because these two components of the drive 100 may be greatly affected by vibration. That is, the chassis 102 supports a drive shaft 112, powered by a motor 114, configured to rotate the disc 110, and the actuator arm 104 supports a reading/writing element that reads/writes data from/to the spinning disc 110. Therefore, vibration of these two components (the chassis 102 and the actuator arm 104) produces a substantial probability of resulting in errors, such as skipping. However, persons having ordinary skill in the art will appreciate that the first and second sensors 106 and 108 may be in connection with any reasonably suitable components where vibration may lead to errors. For example, in another example, a sensor may be located on the drive shaft 112, the motor 114, or the data storage medium itself.

The first and second sensors 106 and 108 may be accelerometers, which detect movement of the actuator arm 104 and the chassis 102, respectively. The detected movement may include information related to the speed or direction a component is moving. The first and second sensors 106 and 108 may be configured to transmit detected movement data to a processor (not shown in FIG. 1). The processor may be located within the drive 100 or may be external to the drive 100. In addition, the processor may be integrated with the drive 100.

Figure 2:
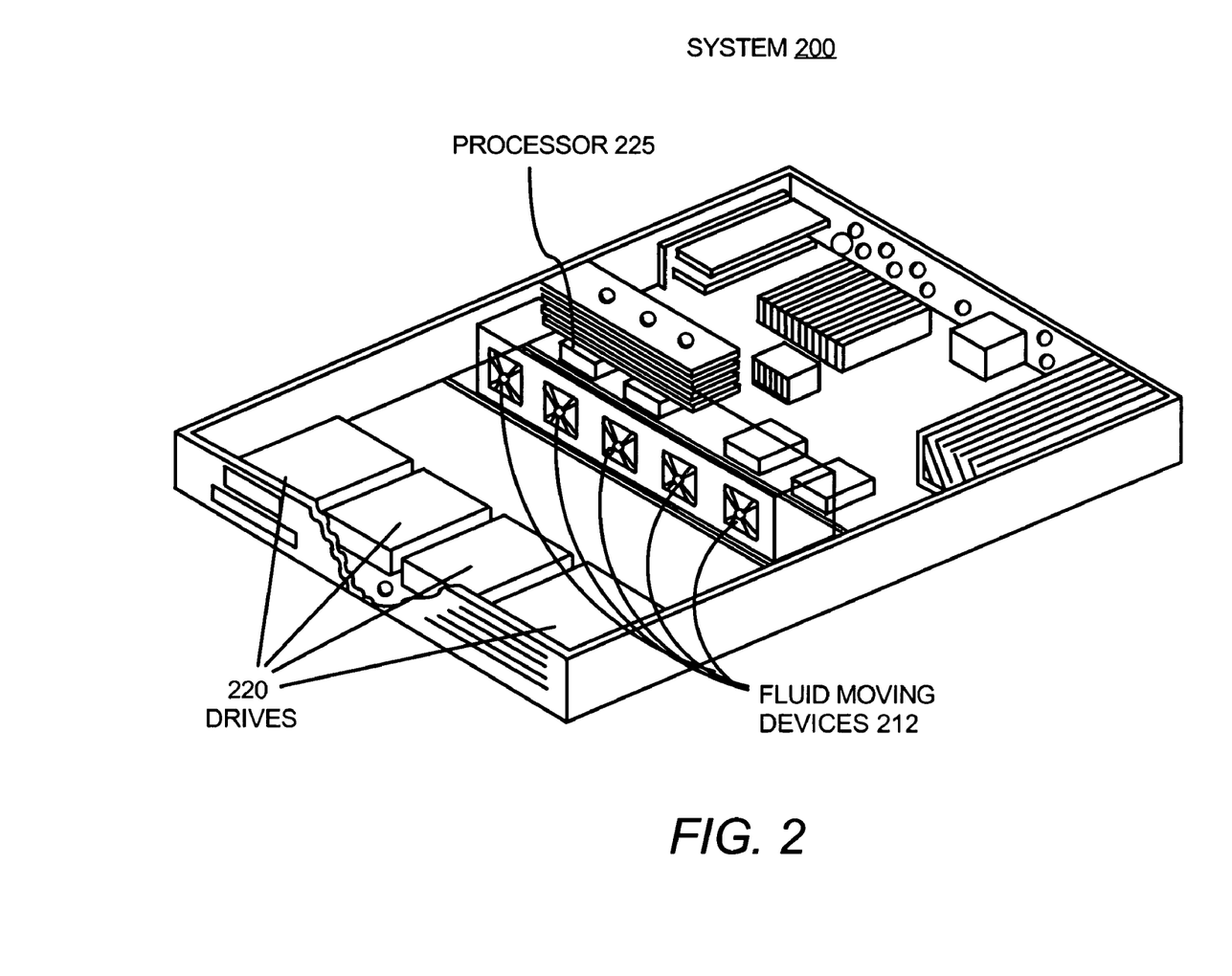
FIG. 2 illustrates a cut-away view of a system having a first and second sensor, according to an embodiment.

FIG. 2 illustrates a system 200 for analyzing vibrational frequencies of components, according to an example. The system 200 includes drives 220, fluid moving devices 212, a processor 225, as well as various other components. By way of example, the system 200 may be a server or other computing device having one or more drives 220, such as, a data storage device. FIG. 2 depicts four drives 220 and five fluid moving devices 212 for purposes of illustration and not of limitation.

The drives 220 of the system 200 may be substantially similar to the drive 100 depicted in FIG. 1. That is, at least one of the four drives 220 may include a first and second sensor 106 and 108 for monitoring the movement of components in the drive 100. The first and second sensors 106 and 108 may monitor components of at least one of the drives 220. For example, at least one of the drives 220 may contain an actuator arm 104 and a chassis 102 having first and second sensors 106 and 108 in connection therewith. However, the first and second sensors 106 and 108 may be in connection with, and may detect the movement of, any other reasonably suitable components of at least one of the drives 220 or other components in the system 200. For instance, at least one of the first and second sensors 106 and 108 and/or additional sensors (not shown) may be in connection with the fluid moving devices 212, the processor 225, etc. Although the system 200 has been depicted as a single computing device, the system 200 may comprise a plurality of servers or other computing devices positioned, for instance, in a rack or a plurality of racks.

The fluid moving devices 212 may be any ventilation mechanism designed to dissipate heat in the drive 100 and/or the system 200, as is known in the art. For example, the fluid moving devices may include fans, blowers, etc. Although not explicitly depicted in FIG. 2, the system 200 may include other vibration inducing elements, such as localized fans for cooling processors or power supplies.

The processor 225 may be any reasonably suitable computing element(s) for receiving input from the first and second sensors 106 and 108. The processor 225 may receive input from any number of different sensors in connection with any reasonably suitable number of components and may alter the status of at least one component in the system 200, as will be described in greater detail below.

Figure 3:
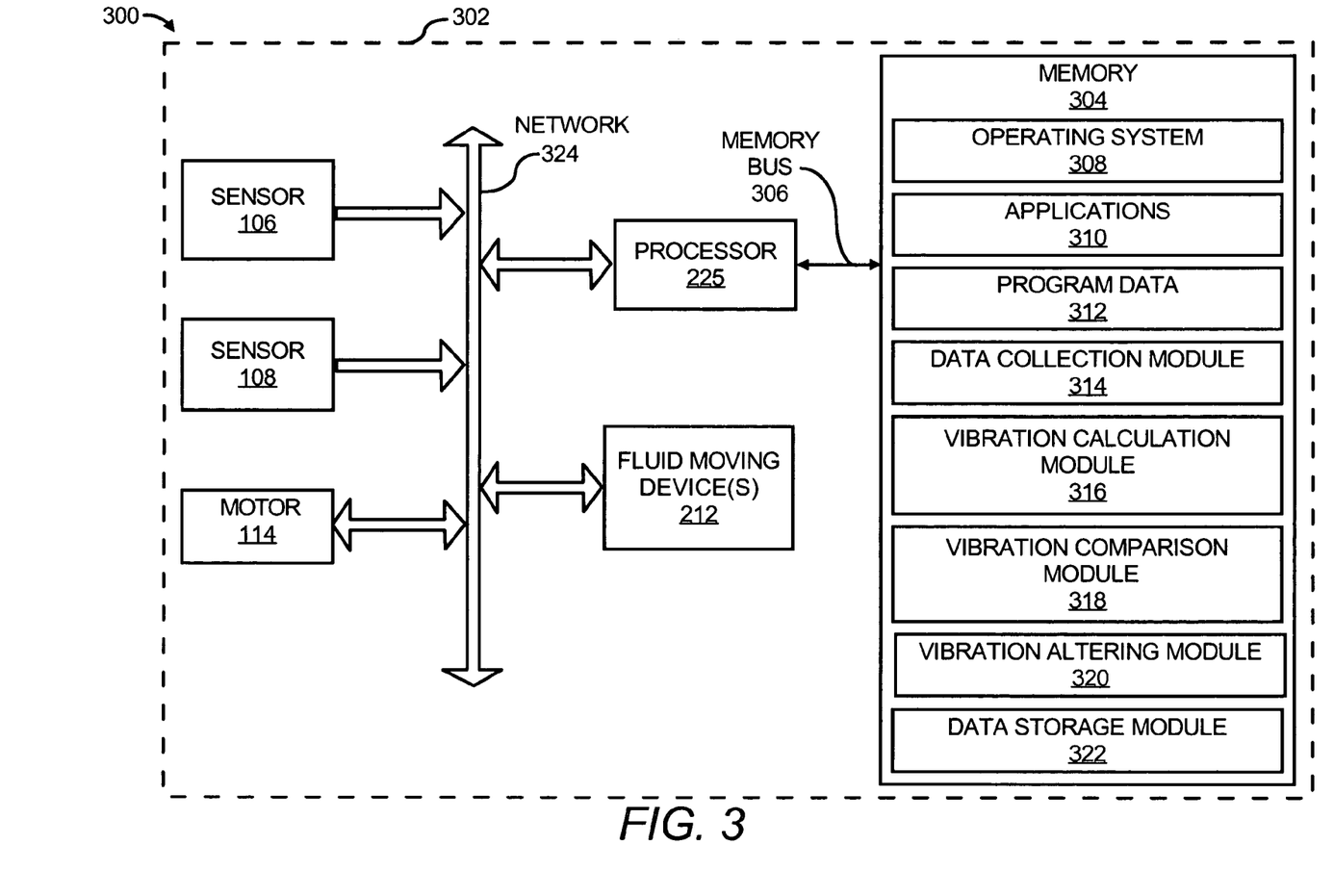
FIG. 3 illustrates a block diagram of a system, according to an embodiment.

FIG. 3 illustrates a block diagram 300 of a system 302 for analyzing vibrational frequencies of components in the drive 100 or the system 200, according to an example. It should be understood that the following description of the block diagram 300 is but one manner of a variety of different manners in which such a system 302 may be configured. In addition, it should be understood that the system 302 may include additional components and that some of the components described herein may be removed and/or modified without departing from the scope of the system 302. For instance, the system 302 may include any number of sensors, memories, processors, fluid moving devices, etc., as well as other components, which may be implemented in the operations of the system 302.

As shown, the system 302 includes the processor 225 depicted in FIG. 2. As described hereinabove, the processor 225 is configured to perform various functions in either the drive 100 or the system 200. In this regard, the processor 225 may comprise a microprocessor, a micro-controller, an application specific integrated circuit (ASIC), and the like, configured to perform various processing functions.

The processor 225 is illustrated as being in communication with a memory 304 through, for instance, a memory bus 306. However, in various instances, the memory 304 may form part of the processor 225 without departing from a scope of the system 302. Generally speaking, the memory 304 may be configured to provide storage of software, algorithms, and the like, that provide the functionality of the processor 225. By way of example, the memory 304 may store an operating system 308, application programs 310, program data 312, and the like. In this regard, the memory 304 may be implemented as a combination of volatile and non-volatile memory, such as DRAM, EEPROM, MRAM, flash memory, and the like. In addition, or alternatively, the memory 304 may comprise a device configured to read from and write to a removable media, such as, a floppy disk, a CD-ROM, a DVD-ROM, or other optical or magnetic media.

The memory 304 is also depicted as including a data collection module 314, a vibration calculation module 316, a vibration comparison module 318, a vibration altering module 320, and a data storage module 322. The processor 225 may invoke or otherwise implement the modules 314-320 to analyze the drive 100 and/or the system 200. The processor 225 may analyze the drive 100 and/or the system 200 to, for instance, determine the frequency of vibration of components of the drive 100 and/or the system 200, compare the vibrational frequency of components, and, under various conditions, alter the vibrational frequency of components.

In determining the respective vibrational frequencies of components, the processor 225 may initially invoke the data collection module 314 to collect data from the fluid moving devices 212 and/or the sensors 106 and 108. In addition, the processor 225 may invoke the vibration calculation module 316 to determine the frequency of vibration of the components from the input received from the sensors 106 and 108 and/or the fluid moving devices 212. In addition, the data collection module 314 may continually or periodically receive and store input from the sensors 106 and 108. The vibration calculation module 316 may perform any reasonably suitable calculations or algorithms to convert the input received and stored in the data collection module 314 into vibrational frequency. For example, the vibration calculation module 316 may perform fast Fourier transforms to calculate the frequencies of vibration.

In addition, the processor 225 may optionally implement the vibration comparison module 318 to compare the vibrational frequencies of different components. For example, the processor 225 may implement the vibration comparison module 318 to compare the frequency of vibration of the actuator arm 104 to the chassis 102. The processor 225 may compare the dominant modes and/or amplitudes of the vibrational frequency of the chassis 102 and the actuator arm 104. The processor 225 may determine whether or not the components in connection with the first and second sensors 106 and 108 are vibrating substantially in synchronization. For example, the processor 225 may determine if the chassis 102 and the actuator arm 104 have similar dominant modes and/or amplitudes of vibrational frequencies. The processor 225 may also determine that the amplitude of the frequency of vibration for a component has risen above a certain undesirable threshold. "Substantially in synchronization" may be defined to include that the different components are vibrating at the same or a similar frequency range with respect to each other. For example, components vibrating with a frequency difference of about 10 to 15 Hz may be considered as being substantially in synchronization. According to an example, experiments or in-situ tests, including, for instance, SNMP traps that capture various issues, may be performed to quantify "substantially in synchronization."

The processor 225 may also invoke the vibration comparison module 318 to develop an artificial neural network (ANN). The ANN may be "trained" to predict and prevent vibration-related errors by continually analyzing input, such as the vibrational frequency of components of the drive 100 and/or the system 200, the operational status of components, such as the speed at which a fluid moving device 212 is operating, etc. The processor 225 may use the ANN to correlate the received input with output conditions, such as synchronized vibration of components and vibration-related errors. Once developed, the processor 225 may use the ANN to predict behavior. For example, the processor 225 may monitor the speed at which fan blades are spinning (RPMs) and the vibrational frequencies of different components that result therefrom.

In this manner, the processor 225 may determine that certain operating conditions of components are likely to lead to vibration-related errors. For instance, the processor 225 may correlate a certain frequency of vibration of the chassis 102 of the drive 100 to a specific speed at which the fluid moving devices 212 are operating. The processor 225 may use the ANN to correlate undesirable vibrational frequencies with the operational status of components by generating a simple network management protocol (SNMP) trap. When components vibrate in synchronization or experience vibration-related errors, the processor 225 creates the SNMP trap by comparing the undesirable vibration to the operating conditions of the components. Essentially, the processor 225 operates a feedback loop by continually correlating operating conditions and frequencies. In this manner, the processor 225 is trained in situ during normal operation of the drive 100 or the system 200. A person having ordinary skill in the art will appreciate that this is a simplified example of the capabilities of an ANN and that the processor 225, described herein, may be capable of analyzing any reasonably suitable number of components and conditions in the drive 100 or the system 200.

The processor 225 may also invoke the vibration altering module 320 to alter the frequency at which a component is vibrating. For example, the processor 225 may determine that the chassis 102 and the actuator arm 104 are vibrating substantially in synchronization, which indicates that there is an increased probability that a vibration-related error will occur. Therefore, the processor 225 may implement the vibration altering module 320 to alter the status of a component, which is at least partially responsible for creating the vibration. For instance, the processor 225 may reduce the speed of at least one of the fluid moving devices 212 or the speed of the drive shaft 112 in at least one of the drives 100, 220. The processor 225 may alter the status of a component within the system 200 or components external to the system 200, such as neighboring servers in a rack. However, persons having ordinary skill in the art will appreciate that the status of any reasonably suitable component may be altered in a plurality of different manners.

In one example, the processor 225 may alter a component of the drive 100 or the system 200 automatically by sending a command signal to the component to be altered. For instance, the processor 225 may reduce or increase the speed of one or more of the fluid moving devices 212. In an example, the drive 100 and the system 200 may be located alongside other drives and systems. For example, the system 200 may be a server situated in a rack with a plurality of other active servers. In this example, the processor 225 may also alter the status of the other components in the rack, as mentioned above. For example, the processor 225 may reduce the RPMs of a fan in a neighboring server also housed in the rack.

In another example, the status of a component may be altered manually by a user. In this example, the processor 225 may provide a user-perceivable indication to notify a user that components are vibrating substantially in synchronization. For example, the indication may be a visual or auditory alarm. As another example, the processor 225 may transmit an alarm signal to a remote computing device over a network, such as, a wired or wireless internal or external network, to thereby provide the visual or audible alarm to the remote computing device. Thus, for instance, when the system 200 comprises a network-attached storage device or a storage area network, the system 200 may be able to alert a user located remote from the system 200.

The processor 225 may further implement the data storage module 322 to store the data collected and generated by the processor 225. For instance, the data storage module 322 may store the data in a data storage location in the memory 304. In addition, the processor 225 may implement the data storage module 322 to store the input from the sensors 106 and 108 and the fluid moving devices 212. Also stored in the data storage module 322 are comparisons made by the vibration comparison module and the modifications made to the operating status of the components.

The data storage module 322 may store information in a variety of different manners. For instance, the data storage module 322 may store the information in the form of a look-up table. In addition, or alternatively, the data storage module 322 may store the information in the form of a map that may be employed to visualize the positions of the sensors 106 and 108 and other components of the drive 100, system 200, and/or other drives, systems, or components.

Instructions from the processor 225 may be transmitted over a network 324 that operates to couple the various components of the system 302. Although not shown, the processor 225 may be equipped with or have access to software and/or hardware to enable the processor 225 to transmit and receive data over the network 324. The network 324 generally represents a wired or wireless structure in the drive 100 and/or the system 200 for the transmission of data between the various components of the system 302. The network 324 may comprise an existing network infrastructure or it may comprise a separate network configuration installed for the purpose of assessing the drive 100 and/or the system 200. According to an example, the sensors 106 and 108 are configured to transmit collected data over the network 324 for storage and processing.

As described above, the processor 225 is configured to control operations of the fluid moving devices 212 and may thus transmit instructions over the network 324 to the fluid moving devices 212 to vary operations of the fluid moving devices 212. The fluid moving devices 212 may each include an actuator or devices for controlling different aspects of the fluid moving devices 212, such as the RPMs of fan blades.

The fluid moving devices 212 may also include respective interfaces (not shown) that generally enable data transfer between the fluid moving devices 212 and the processor 225 over the network 324. The interfaces may comprise any reasonably suitable hardware and/or software capable of enabling the data transfer over the network 324.

According to another example, however, the processor 225 may not have direct control over the fluid moving devices 212, such as, in instances where the fluid moving devices 212 are configured to operate in substantially independent manners with respect to each other. In these instances, for example, the fluid moving devices 212 may be configured to vary their operations automatically according to the speeds at which the fluid moving devices 212 are operating, the vibration the fluid moving devices 212 are producing, the speeds and vibrations at which other components are moving/producing, etc. Thus, for instance, these fluid moving devices 212 may alter their statuses when certain parameters reach predetermined thresholds. In other words, the fluid moving devices 212 according to this example may be locally controlled.

Figure 4:
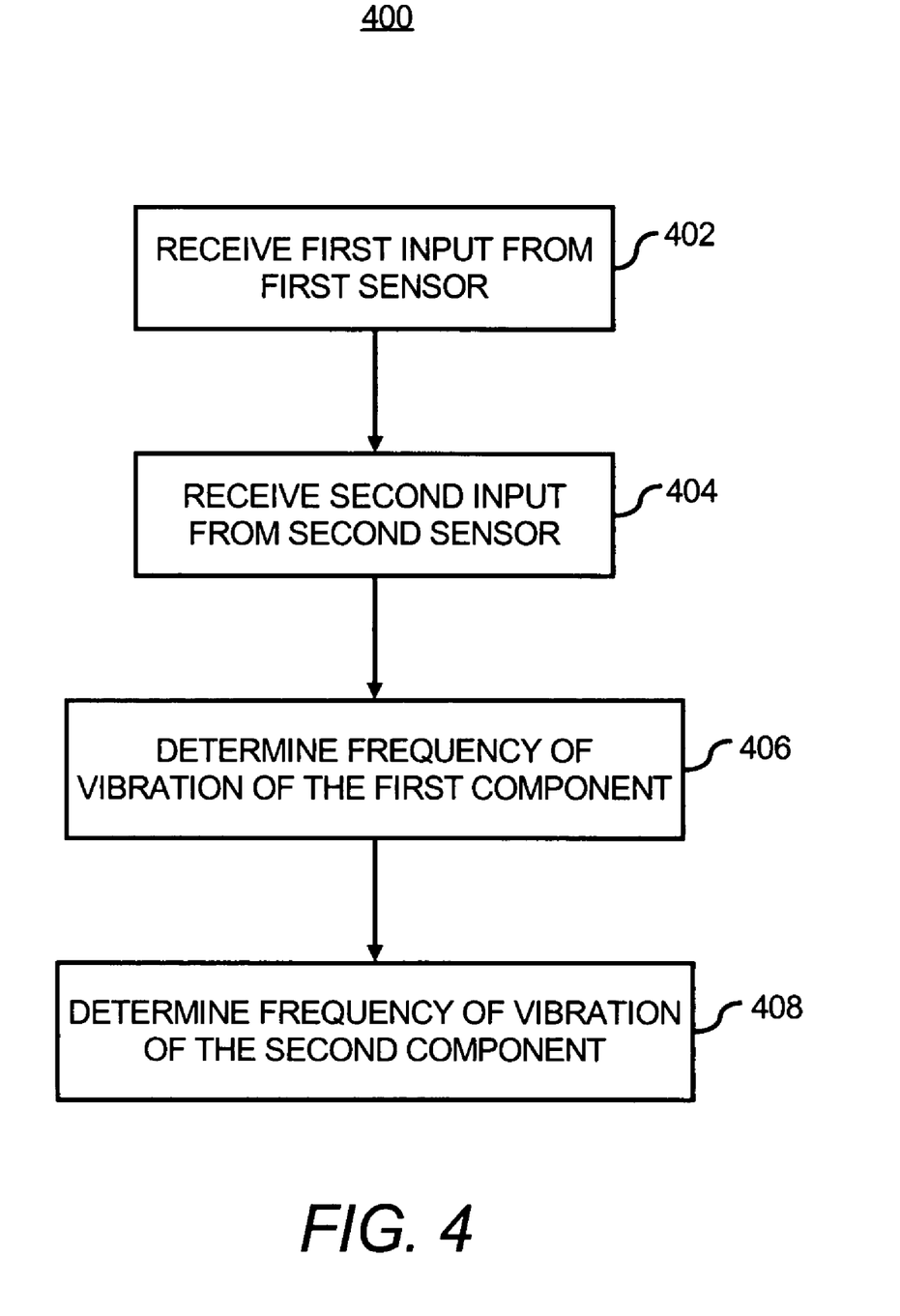
FIG. 4 illustrates a flow chart of a method for determining vibrational frequencies in a device, according to an embodiment.

With reference now to FIG. 4, there is shown a flow chart of a method 400 of determining vibrational frequencies in a device, such as, the drive 100 or system 200, having a first sensor 106 in connection with a first component, such as the actuator arm 104, and a second sensor 108 in connection with a second component 102, such as the chassis 102, according to an example. The method 400 is described with respect to FIGS. 1-3, by way of example and not of limitation. A person having ordinary skill in the art will appreciate that additional steps may be added to the method 400 and, similarly, that some of the steps outlined in FIG. 4A may be omitted, changed, or rearranged without departing from a scope of the method 400.

At step 402, the processor 225 may receive a first input from the first sensor 106. The first sensor 106 is in connection with the first component of the device and is configured to detect movement of the first component. Thus, for instance, the processor 225 may receive data pertaining to the movement of the first component (actuator arm 104) from the first sensor 106.

At step 404, the processor 225 may receive a second input from the second sensor 108. The second sensor 108 is in connection with the second component of the device and is configured to detect movement of the second component. Thus, for instance, the processor 225 may receive data pertaining to the movement of the second component (chassis 102) from the second sensor 108.

At step 406, the processor 225 may determine the frequency of vibration of the first component (actuator arm 104) using the first input received from the first sensor 106. In addition, at step 408, the processor 225 may determine the frequency of vibration of the second component (chassis 102) using the second input received from the second sensor 108.

Figure 5A:
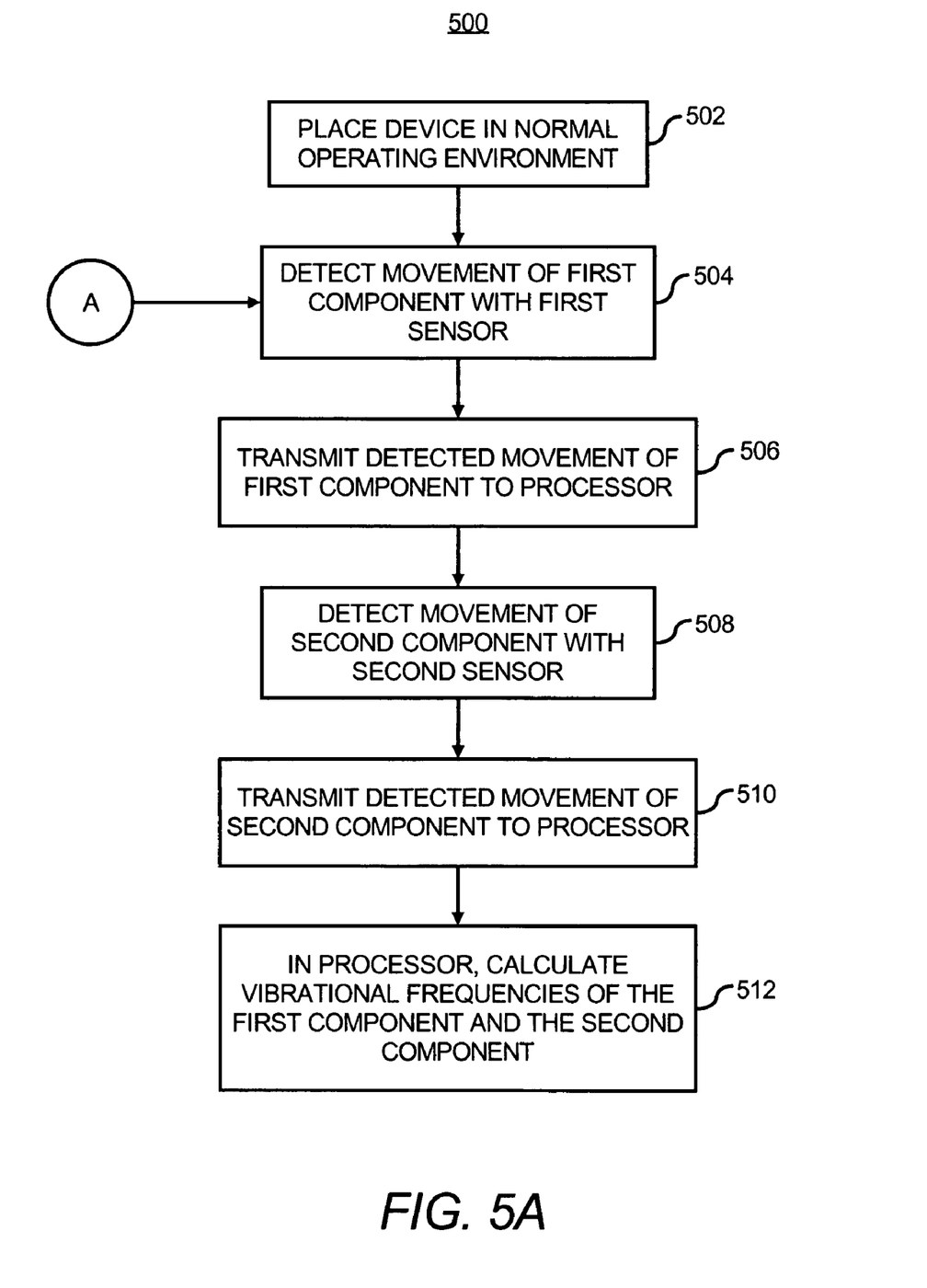
FIG. 5A illustrates a flow chart of a method for calculating the frequency of vibration for a component, according to an embodiment.

Turning now to FIG. 5A, there is illustrated a flow chart of a method 500 for calculating the vibrational frequencies of components in a device, according to an example. For instance, the method 500 may be used in conjunction with the drive 100, illustrated in FIG. 1 and/or the system 200 illustrated in FIG. 2 to determine the vibrational frequencies of the actuator arm 104 and the chassis 102. The method 500 is described with respect to FIGS. 1-3, by way of example and not of limitation. A person having ordinary skill in the art will appreciate that additional steps may be added to the method 500 and, similarly, that some of the steps outlined in FIG. 5A may be omitted, changed, or rearranged without departing from a scope of the method 500.

At step 502, a drive is placed into position. For example, the device may be placed in its normal operating environment, such as a computing device, a server in a rack, etc. The normal operating environment may include, for instance, any reasonably suitable environment other than a testing environment, where a user regularly reads or writes data to the drive 100.

At step 504, movement of the first component may be detected. In addition, at step 506, the detected movement of the first component may be transmitted to the processor 225. Likewise, at step 508, movement of the second component may be detected and at step 510, the detected movement may be transmitted to the processor 225.

For example, the first component may be the actuator arm 104 and the second component may be the chassis 102 depicted in FIG. 1. Movement, such as vibration, of the chassis 102 and the actuator arm 104 may be detected by first and second sensors 106 and 108. In addition, the detected movement may be transmitted to the processor 225 via the network 324. As another example, the detected movement may be transmitted to another processor associated with the drive 100.

At step 512, the processor 225 may calculate the vibrational frequencies of the first and second components. For example, the processor 225 may invoke the vibration calculation module 316 to perform a fast Fourier transform to determine the vibrational frequencies of the chassis 102 and the actuator arm 104 based upon the detected movement.

Figure 5B:
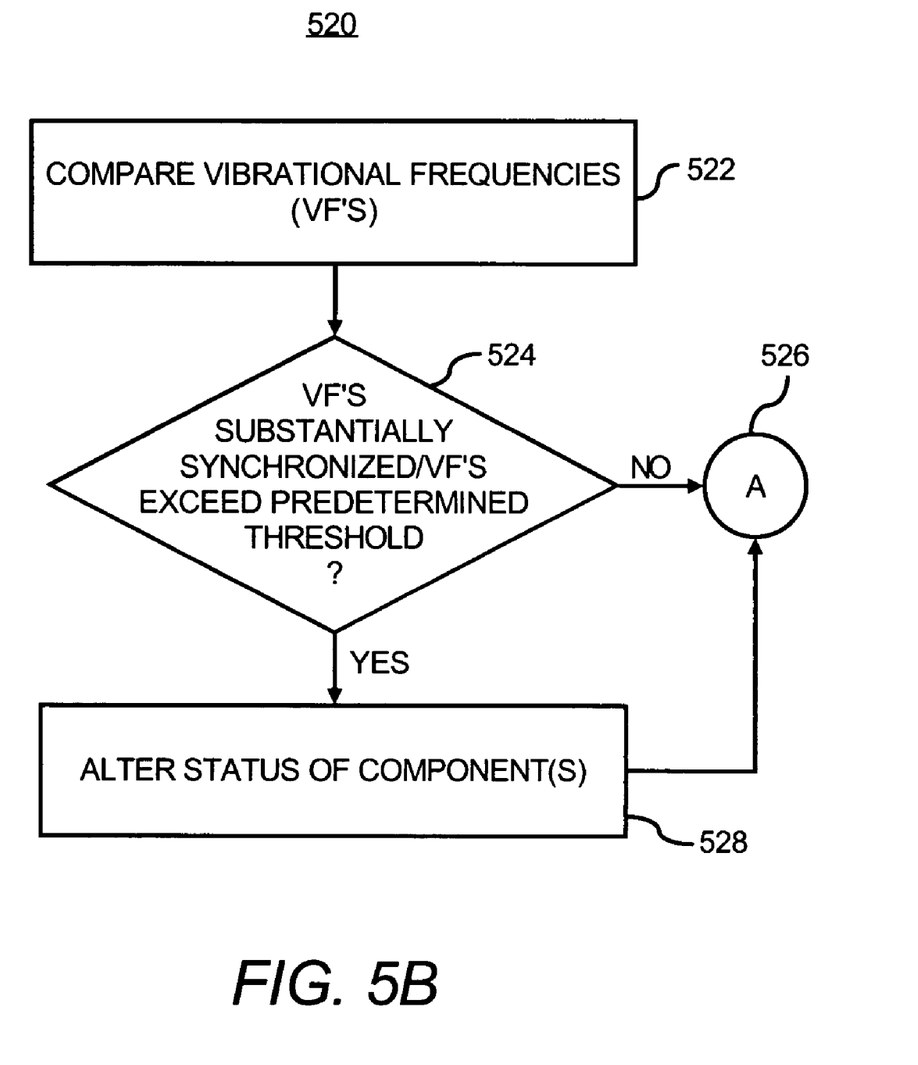
FIG. 5B illustrates a flow chart of a method for altering the frequency of a component, according to an embodiment.

FIG. 5B illustrates a flow chart of a method 520 for altering the status of at least one component, according to an example. For instance, the method 520 may be implemented to alter the status of at least one vibration-causing component and/or component in the device, such as, the drive 100, illustrated in FIG. 1 and/or the system 200 illustrated in FIG. 2. The method 520 is described with respect to FIGS. 1-3, by way of example and not of limitation. A person having ordinary skill in the art will appreciate that additional steps may be added to the method 520 and, similarly, that some of the steps outlined in FIG. 5B may be omitted, changed, or rearranged without departing from a scope of the method 520.

At step 522, the vibrational frequencies of at least two components may be compared. For example, the processor 225 may compare the dominant frequencies, modes, and/or amplitudes at which the chassis 102 and the actuator arm 104 are vibrating.

At step 524, the processor 225 may make a determination as to whether or not the components in connection with the first and second sensors 106 and 108 are vibrating substantially in synchronization. For example, the processor 225 may determine if the chassis 102 and the actuator arm 104 are vibrating substantially in synchronization. In addition, or alternatively, the processor 225 may determine whether that the amplitude of the vibrational frequency of a component has exceeded a predetermined threshold. The predetermined threshold may be set, for instance, to a level that is indicative of a safe operating vibration range for the components contained in the device.

If the processor 225 determines that the components are not vibrating substantially in synchronization, such as, that the chassis 102 and the actuator arm 104 are vibrating at different frequencies or at frequencies which have different dominant modes and/or amplitudes, steps 504-512 and 522-524 may be performed again as indicated at step 526. Step 526 may also be performed if the processor 225 determines that none of the vibrational frequencies have exceeded the predetermined threshold.

However, if the processor 225 determines that the components are vibrating substantially in synchronization or that at least one of the vibrational frequencies has exceeded the predetermined threshold, for example, that the chassis 102 and the actuator arm 104 have similar dominant modes and/or amplitudes of vibrational frequencies, the processor 225 may cause the status of at least one vibration-causing component to be altered, as indicated at step 528. For example, the processor 225 may cause the speed of a vibration-causing component, such as the fluid moving device 212 or the drive shaft 112, to be reduced or increased.

After the status of a component has been altered, the method 520 may continue back to step 526, which continues to step 504 of the method 500 to detect the movement of the components. Because the status of a vibration-causing component has been altered, the vibrational frequencies of the components should also change and, thus, the components will no longer be vibrating in substantial synchronization. In this manner, substantially synchronized vibration may be reduced or eliminated, thereby reducing the probability of vibration-related errors occurring in the drive 100 and/or system 200.

Figure 6:
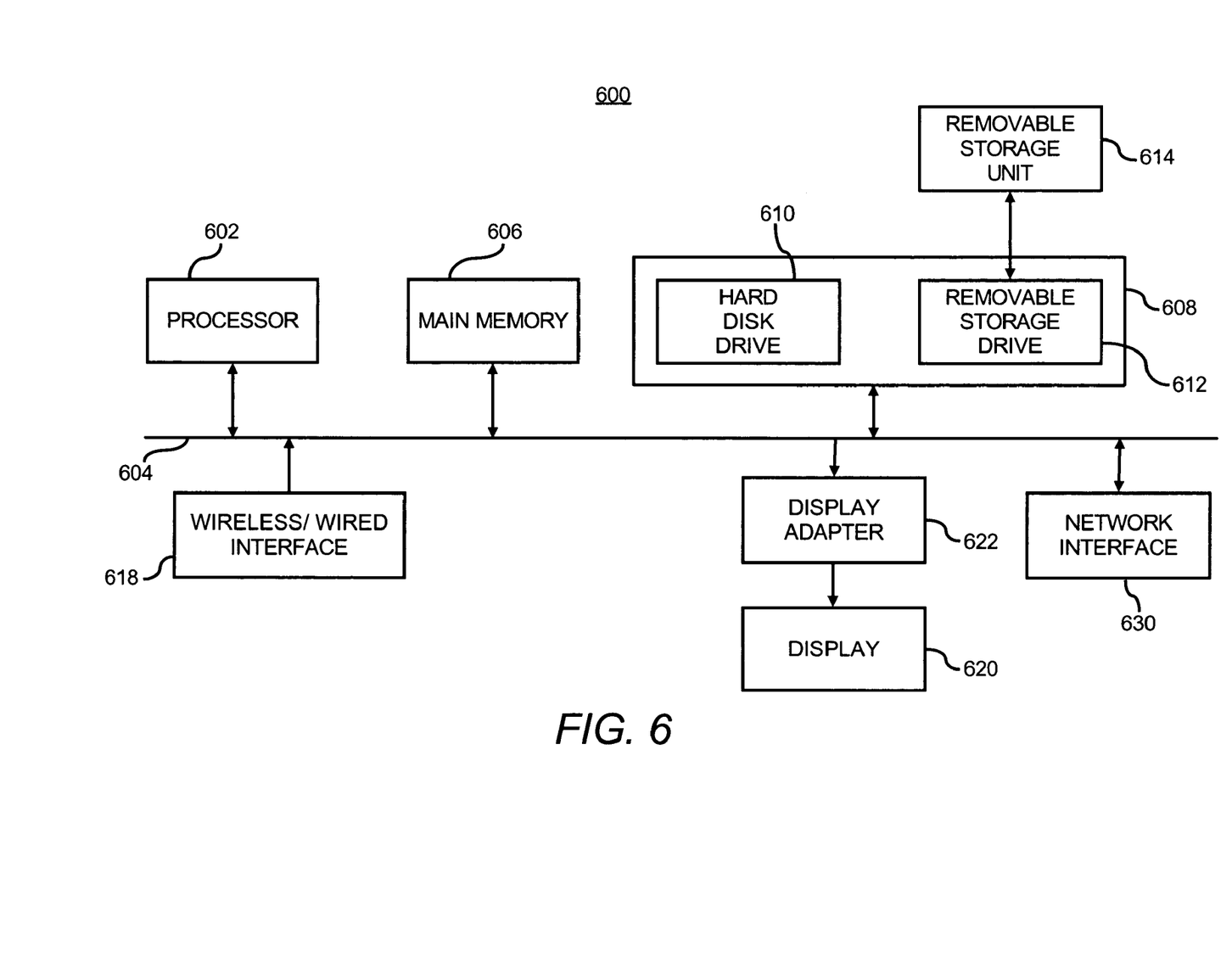
FIG. 6 illustrates a block diagram of a general purpose computing system configured to implement some or all of the steps outlined in FIGS. 4, 5A and 5B, according to an embodiment.

FIG. 6 illustrates an exemplary block diagram of a general purpose computing system 600 that is operable to implement some or all of the steps outlined in the methods 400, 500, and 520 described above. The computing system 600, or any part thereof, may be located within, or external to, the drive 100 and/or the system 200. It should be understood that a more sophisticated computing system 600 is operable to be used in place of the one depicted in FIG. 6. Furthermore, components shown in FIG. 6 may be added or removed from the computing system 600 to provide the desired functionality.

The computing system 600 includes one or more processors, such as processor 602, providing an execution platform for executing software. The processor 602 may be the processor 225 used in the system 200. Thus, the computing system 600 includes one or more single-core or multi-core processors of any of a number of computer processors, such as processors from Intel and AMD. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes.

Commands and data from the processor 602 are communicated over a communication bus 604, which may be a common bus used in the system 200. The computing system 600 also includes a main memory 606 where software is resident during runtime, and a secondary memory 608. The secondary memory 608 may also be a computer readable medium (CRM) that may be used to store the software programs, applications, or modules for implementing the methods 400, 500, and 520. The main memory 606 and secondary memory 608 (and an optional removable storage unit 614) each includes, for example, a hard disk drive and/or a removable storage drive 612 representing a floppy diskette drive, a magnetic tape drive, a compact disk drive, etc., or a nonvolatile memory where a copy of the software may be stored. Thus, the main memory 606 or the secondary memory 608, or both, may be the drive 100 or one of the drives 220 in system 200. In one example, the secondary memory 608 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions.

The computing system 600 may include a display 620 connected via a display adapter 622, user interfaces comprising a wireless interface for establishing wire connectively with clients. Again, the display 620 may be a part or used by the system 200 for the display of information. A network interface 630 is provided for communicating with networks such as a local area network (LAN), a wide area network (WAN), or a public data network such as the Internet.

What has been described and illustrated herein are embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method of determining vibrational frequencies in a device having a first sensor in connection with a first component and a second sensor in connection with a second component, said method comprising:
   receiving a first input from the first sensor in connection with the first component of the device, said first sensor being configured to detect movement of the first component;
   receiving a second input from the second sensor in connection with the second component of the device, said second sensor being configured to detect movement of the second component;
   determining the frequency of vibration of the first component using the first input received from the first sensor and the frequency of the second component using the second input received from the second sensor;
   comparing the frequency of vibration of the first component to the frequency of vibration of the second component; and
   determining whether the frequency of vibration of the first component is substantially synchronized with the frequency of vibration of the second component.

2. The method of claim 1, further comprising:
   altering the status of a vibration-causing component in response to a determination that the frequency of vibration of the first component and the frequency of vibration of the second component are substantially in synchronization.

3. The method of claim 2, wherein altering the status of a vibration-causing component includes one of reducing and increasing the speed of at least one of rotating element of the vibration-causing component and the device.

4. The method of claim 1, further comprising:
   activating at least one of a visual and audible alarm in response to a determination that the frequency of vibration of the first component and the frequency of vibration of the second component are substantially in synchronization.

5. The method of claim 1, wherein comparing the frequency of vibration includes utilizing an artificial neural network (ANN) to compare the frequency of vibration of the first component and the frequency of vibration of the second component.

6. The method of claim 1, wherein determining the frequency of vibration further comprises:
   performing a fast Fourier transform (FFT) to determine the frequency of vibration for the first component and the frequency of vibration of the second component.

7. The method of claim 1, further comprising:
   placing the device in a normal operating environment for the device prior to receiving the first input and the second input.

8. The method of claim 1, further comprising:
   determining whether the frequency of vibration of at least one of the first component and the second component exceeds a predetermined threshold; and
   altering at least one of a vibration-causing component and an element of the drive in response to the frequency of vibration exceeding the predetermined threshold.

9. A system for detecting vibration comprising:
   at least one drive, said at least one drive including,
      a first component;
      a second component, said second component being movable with respect to the first component;
      a first sensor in connection with the first component, said first sensor being configured to detect movement of the first component; and
      a second sensor in connection with the second component, said second sensor being configured to detect movement of the second component; and
   a processor for receiving a first input from the first sensor and a second input from the second sensor and for determining a frequency of vibration of the first component based upon the first input and a frequency of vibration of the second component based upon the second input, wherein the processor is further operable to compare the frequency of vibration of the first component to the frequency of vibration of the second component, and wherein the processor is further operable to alter the status of a vibration-causing component in response to a determination that the frequency of vibration of the first component is substantially in synchronization with the frequency of vibration of the second component.

10. The system of claim 9, wherein the at least one drive is positioned in a server.

11. The system of claim 10, wherein the server is positioned in a rack containing at least one other server, wherein the processor is configured to alter the status of a vibration-causing component in at least one of the server and the other server.

12. The system of claim 9, further comprising an alarm, wherein the processor is configured to activate the alarm when at least two components are detected to be vibrating in substantial synchronization.

13. The system of claim 9, wherein the processor is operable to determine whether or not the frequency of vibration for at least one of the first component and the second component has exceeded a predetermined threshold.

14. A system for detecting vibration comprising:
at least one drive, said at least one drive including,
a first component;
a second component, said second component being movable with respect to the first component;
a first sensor in connection with the first component, said first sensor being configured to detect movement of the first component; and
a second sensor in connection with the second component, said second sensor being configured to detect movement of the second component; and
a processor for receiving a first input from the first sensor and a second input from the second sensor and for determining a frequency of vibration of the first component based upon the first input and a frequency of vibration of the second component based upon the second input, wherein the processor is operable to develop an artificial neural network (ANN) to predict vibration-related errors by determining that an operational status of a component will create an undesirable frequency of vibration.

15. The system of claim 14, wherein the at least one drive is positioned in a server.

16. The system of claim 15, wherein the server is positioned in a rack containing at least one other server, wherein the processor is configured to alter the status of a vibration-causing component in at least one of the server and the other server.

17. The system of claim 14, further comprising an alarm, wherein the processor is configured to activate the alarm when at least two components are detected to be vibrating in substantial synchronization.

18. The system of claim 14, wherein the processor is operable to determine whether or not the frequency of vibration for at least one of the first component and the second component has exceeded a predetermined threshold.

* * * * *

UNITED STATES PATENT AND TRADEMARK OFFICE
CERTIFICATE OF CORRECTION

| | | |
|---|---|---|
| PATENT NO. | : 7,508,614 B1 | Page 1 of 1 |
| APPLICATION NO. | : 11/784620 | |
| DATED | : March 24, 2009 | |
| INVENTOR(S) | : Ratnesh K. Sharma et al. | |

It is certified that error appears in the above-identified patent and that said Letters Patent is hereby corrected as shown below:

In column 3, line 22, delete "rang" and insert -- range --, therefor.

In column 11, line 40, delete "connectively" and insert -- connectivity --, therefor.

In column 12, line 3, in Claim 1, after "frequency" insert -- of vibration --.

Signed and Sealed this

Twenty-eighth Day of July, 2009

JOHN DOLL
*Acting Director of the United States Patent and Trademark Office*